Figure 1:
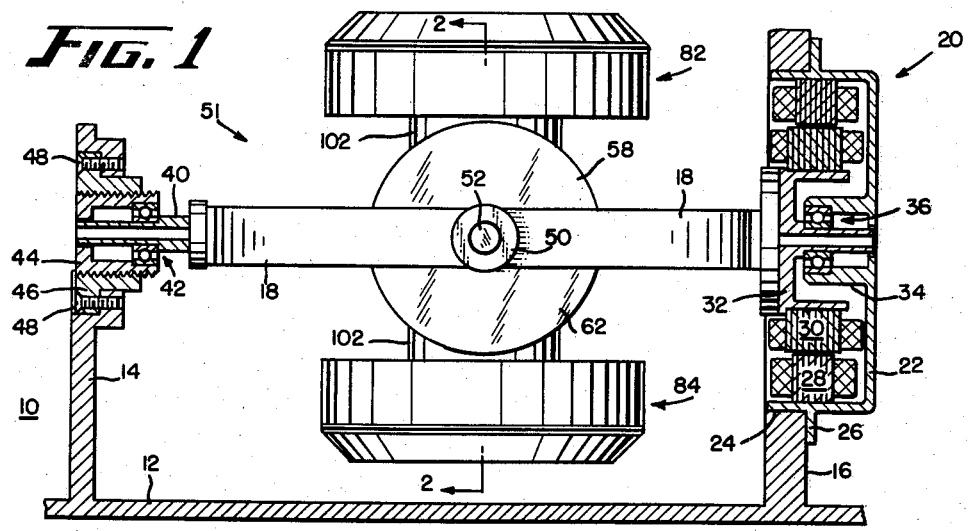

April 14, 1959  H. L. BROWN  2,881,618
GYROSCOPIC APPARATUS
Filed April 12, 1955

INVENTOR.
HARRY L. BROWN
BY
ATTORNEY

United States Patent Office 2,881,618
Patented Apr. 14, 1959

2,881,618

GYROSCOPIC APPARATUS

Harry L. Brown, St. Paul, Minn., assignor to Minneapolis-Honeywell Regulator Company, Minneapolis, Minn., a corporation of Delaware Application April 12, 1955, Serial No. 500,796

8 Claims. (Cl. 74—5.6)

This invention pertains to gyroscopic devices such as vertical and directional gyros and more specifically to the mounting of pickoff means on said gyros. By pickoff means is meant any device or means that serves to sense rotation between relatively rotatable parts of a gyro. This invention has particular application to gyros having pickoffs of the electromagnetic type, but is not limited thereto.

Prior art two gimbal gyros having pickoff means mounted on the inner gimbal so as to sense relative rotation between the inner and outer gimbals tend to become quite bulky and heavy. The spin motor is centrally located and of necessity is of a large size so as to meet drift specifications. The pickoff means is mounted on the inner gimbal to one side of the spin motor and, depending on the type used, adds a certain amount of gimbal unbalance and takes up a certain amount of space. Electromagnetic type pickoffs are characteristically heavy and bulky since they comprise magnetic steel laminations and the usual winding means so when they are specified, the gimbal unbalance becomes substantial and additional space has to be provided in order to accommodate their large size.

The prior practice has been to correct the static gimbal unbalance by adding compensating masses to the gimbals on the opposite side of the spin motor housing from the pickoff. While this does serve to provide a static balance, the load supported by the gimbal bearings is also increased which is very undesirable inasmuch as gyroscopic errors are proportional to the bearing friction and bearing friction in turn increases with the loading thereon.

The present invention provides a unique placement of the pickoff means that senses displacement between the inner gimbal and the outer gimbal and which overcomes the above named disadvantages of the prior art devices. The symmetrical design of the present invention permits a compact and relatively light device and eliminates all but the minor balance problems due to lack of homogeneity of the materials used.

It is therefore an object of the invention to provide an improved gyroscopic apparatus.

A further object of the invention is to provide an improved method of mounting pickoff means on a gyroscope.

Still another object of the invention is to provide an improved method of mounting electromagnetic pickoffs on the inner gimbal of a two-gimbal gyro.

A further object of the invention is to provide a gyroscope having a pair of spin motors having coaxial spin axes and being mounted on a first member of a pickoff device on opposite sides thereof with a second member of said pickoff device rotatably supporting said first member for rotation about an axis normal to said spin axes.

Figure 2:
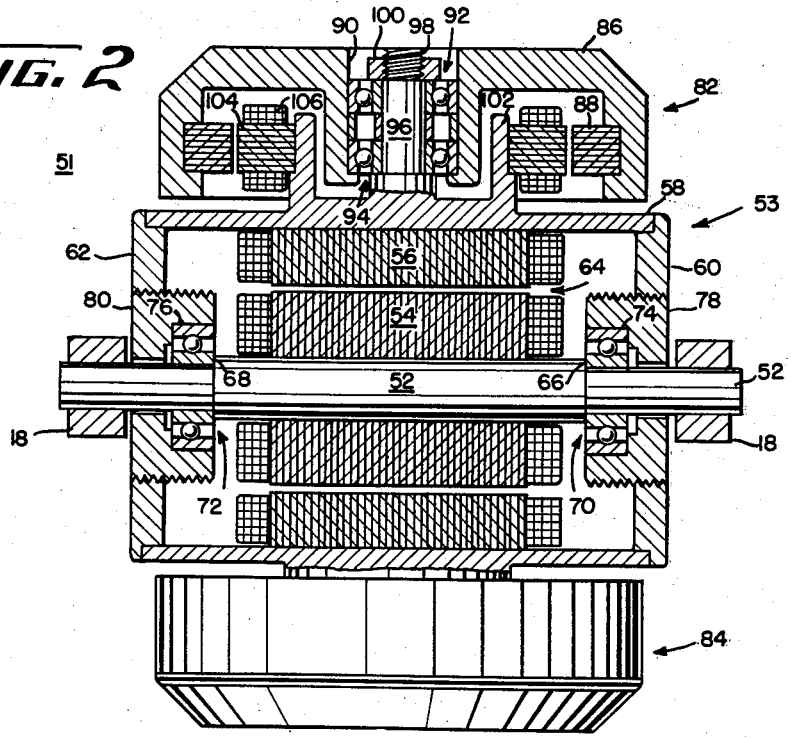

These and other objects pertaining to the operation of and construction of gyroscopes will be better understood by making reference to the following specification together with the accompanying drawings in which:

Figure 1 is a side elevational view, partly in section, of an improved gyroscope embodying the principles of my invention; and Figure 2 is a view, partly in cross section, of the spin motor and pickoff assembly used on the apparatus shown in Figure 1 as viewed along section lines 2—2 in Figure 1.

In Figure 1, the numeral 10 denotes the basic structure of a two-gimbal gyroscope comprising in part a frame member 12 having a pair of support members 14 and 16. A first or outer gimbal 18 is supported by members 14 and 16 for rotation about a first axis. The support of gimbal 18 by member 16 comprises a combination "pancake" type synchro mounting and gimbal support, the details of which are the subject matter of a copending application in the name of Henry A. Dinter, Serial No. 467,534, filed November 8, 1954. This combined synchro mounting and gimbal support 20 comprises a main housing 22 having a circular periphery fitted into a suitable aperture 24 in member 16 of frame 12, a flange 26 on housing 22 abutting against member 16 to provide an alignment means. A stator 28 of the synchro pickoff is pressed into the housing 22 and cooperates with a rotor portion 30 of the pickoff that is supported on a rotor drum 32 which in turn is integrally attached to one end of the outer gimbal 18. Housing 22 has an inwardly extending hub portion 34 in which is disposed the outer race of a suitable bearing 36, the inner race of which is pressed on a suitable reduced portion of rotor drum 32. It will thus be appreciated that the assembly 20 serves as a means of journalling the right end of gimbal 18, as shown in Figure 1, with respect to frame 12 as well as to provide a means of sensing relative to rotation between gimbal 18 and frame 12.

A gudgeon pin 40 is secured to the left side of gimbal 18, as shown in Figure 1, and is pressed through the inner race of a suitable bearing member 42. The outer race of bearing 42 is pressed into a suitable cup-like member 44 that is adjustable in a member 46 which in turn is secured to the member 14 of frame or base 12 by suitable means such as screws 48. It will be appreciated that by adjusting the position of cup member 44 in member 46 that the end play in bearings 42 and 36, for instance, can be simultaneously controlled.

Outer gimbal 18 has a pair of hub portions 50 (only one shown in Figure 1) which define a second or inner gimbal axis which is normal to the axis defined by bearings 42 and 36. A shaft 52 which supports an inner or second gimbal assembly 51 is stationarily supported in hubs 50 of gimbal 18 and supports at its mid section the first member 54 of a two-part electromagnetic type pickoff 53 of conventional construction comprising magnetic steel laminations and winding means. A second member 56 of the pickoff is centrally mounted in a cylindrical housing member 58 having end members 60 and 62. Members 54 and 56 of the pickoff are separated by an annular air gap 64.

The central portion of shaft 52 upon which is mounted member 54 of the pickoff 53 has a slightly greater diameter than the portions of said shaft 52 that are engaged by gimbal 18. A pair of shoulders 66 and 68 are formed between the portions of different diameter. The inner races of suitable bearing means 70 and 72 are pressed onto the reduced portions of shaft 52 until they abut against shoulders 66 and 68, respectively, and the outer races thereof are pressed into suitably shaped recesses 74 and 76 of axially adjustable bearing holders 78 and 80 which are adjustably positioned with respect to end members 60 and 62 of housing 58 by means of threads on the cooperating surfaces therebetween.

A pair of spin motors 82 and 84 are mounted on diametrically opposite sides of housing 58 of synchro 53. Stated otherwise, spin motors 82 and 84 are positioned on opposite sides of the axis defined by bearings 70 and 72, this being the axis of the second or inner gimbal.

In general, spin motors 82 and 84 are identical to one another and hence only a detailed description of spin motor 82 will be set forth. Spin motor 82 comprises a rotor member 86 of unbrella type construction having a plurality of annular magnetic steel laminations 88 or equivalent hysteresis ring for cooperation with spinning means to be described below. Rotor 86 has a central aperture 90 in which are disposed the outer races of a pair of suitable bearings 92 and 94, said bearings being spaced apart by suitable means. The inner races of bearings 92 and 94 are pressed on a stub shaft 96 which, preferably, is an integral part of housing 58 of the synchro pickoff. The free extremity of stub shaft 96 is threaded as at 98 and allows a clamping nut 100 to be screwed thereupon so as to secure bearings 92 and 94 with respect to shaft 96. A hub portion 102 of larger diameter and concentric with shaft 96 and also preferably integral with housing 58 of the synchro pickoff serves as a means for mounting the stator means for rotor 86 that includes a plurality of laminations 104 together with suitable winding means 106. Windings 106 are adapted to be energized by suitable electromotive force means, not shown, by suitable contact means such as slip rings or other suitable rotating contact assembly, not shown, between the gimbals and frame 12 so as to develop a rotating magnetic flux which reacts with portion 88 of rotor 86 so as to cause the latter to rotate.

It will be appreciated that bearings 92 and 94 define the spin axis of spin motor 82 and the arrangement of spin motors 82 and 84 with respect to pickoff 58 is preferably that which makes their spin axes coaxial as well as being normal to the axis defined by bearings 70 and 72 of the inner or second gimbal 51. Also, spin motors 82 and 84 are energized so as to produce the same direction of rotation about their common or coaxial spin axes.

It should be noted that bearings 70 and 72 serve a double function. First, as is true with any conventional rotary electromagnetic device, the bearings permit relative rotation between the two principal portions thereof. Secondly, the bearings 70 and 72 provide the bearing support for the inner gimbal assembly with respect to the outer gimbal 18.

The apparatus shown in the drawings has been shown in as simple a form as possible in order to describe the invention and the particular proportions shown should not be deemed to limit the scope of the invention. It should be further appreciated that suitable means such as slip rings or the like would be used for transferring electrical energy from the frame 12 to the outer gimbal 18 as well as from the outer gimbal 18 to the inner gimbal assembly 51 shown on Figure 2. Further, electromagnetic means such as erection motors have not been shown but it should be understood that the gimbals could be adapted to be slaved to the vertical or to the horizon by suitable means such as torque motors.

Also, if desired, shaft 52 could be made hollow so as to bring out the leads for member 54 of the pickoff 53.

It will be appreciated that the gyro structure shown and described is a symmetrical device that eliminates static unbalance problems as well as produces a very compact and relatively light structure. In operation, should base 12 be pivoted about the axis defined by bearings 70 and 72 the resultant displacement will be sensed by the pickoff 53. Further, rotation of base 12 about the axis defined by bearings 36 and 42 would be sensed by the "pancake" pickoff 20.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In a gyroscope: a base; a first gimbal supported on said base for rotation about a first axis; a second gimbal supported on said first gimbal for rotation about a second axis normal to said first axis; a pair of spin motors comprising rotor means supported on said second gimbal on opposite sides of said second axis and having coaxial spin axes normal to said second axis; and means positioned between said spin motors responding to rotation of said second gimbal about said second axis comprising a first member attached to said first gimbal and a second member attached to said second gimbal.

2. In gyroscopic apparatus of the class described: a base; a gimbal supported on said base for rotation about a first axis; an electromagnetic pickoff device mounted on said gimbal and comprising a first member attached to said gimbal and a second member rotatably mounted on said first member for rotation about a second axis, said second axis being normal to said first axis; and a pair of spin motors mounted on said second member on opposite sides of said second axis and with said second member positioned between said pair of spin motors, said spin motors each comprising a rotor member and spinning means therefor, and said spin motors having spin axes coaxial as well as normal to said second axis.

3. In a gyroscope: a base; a first gimbal supported on said base for rotation about a first axis; a second gimbal supported on said first gimbal for rotation about a second axis normal to said first axis; a pair of spin motors comprising rotor means supported on said second gimbal on opposite sides of said second axis and having coaxial spin axes normal to said second axis; and control means responsive to rotation of said second gimbal about said second axis positioned between said spin motors.

4. In gyroscopic apparatus of the class described: a base; a gimbal supported on said base for rotation about a first axis; control means centrally mounted on said gimbal and comprising a first member attached to said gimbal and a second member rotatably mounted on said first member for rotation about a second axis; and a plurality of spin motors mounted on said second member, said spin motors rotating about axes normal to said second axis.

5. In a gyroscope: a base; a first gimbal supported on said base for rotation about a first axis; a second gimbal supported on said first gimbal for rotation about a second axis normal to said first axis; a pair of spin motors comprising rotor means supported on said second gimbal on opposite sides of said second axis and having coaxial spin axes normal to said second axis; magnetic pickoff means positioned between said spin motors responding to rotation of said second gimbal about said second axis; and magnetic pickoff means mounted on said base for sensing relative rotation between said base and said first gimbal.

6. In a gyroscopic device: a gimbal supported for rotation about a first axis; a pair of spin motors comprising rotor means supported on said gimbal on opposite sides of said axis and having coaxial spin axes normal to said axis; and means positioned between said spin motors responding to rotation of said gimbal about said first axis.

7. In a gyroscopic device: a gimbal supported for rotation about an axis; a plurality of spin motors comprising rotor means having spin axes supported on said gimbal and having said spin axes normal to said gimbal axis; and means positioned between said spin motors responding to rotation of said gimbal about said gimbal axis.

8. In a gyroscopic device: a gimbal supported for rotation about an axis; a plurality of spin motors comprising rotor means supported on said gimbal; and control means positioned between said spin motors and responding to rotation of said gimbal about said axis.

References Cited in the file of this patent

UNITED STATES PATENTS

| | | |
|---|---|---|
| 1,764,714 | Boykow | June 17, 1930 |
| 1,931,191 | Gray | Oct. 17, 1933 |
| 2,256,475 | Esval et al. | Sept. 23, 1941 |
| 2,517,612 | Varian | Aug. 8, 1950 |
| 2,720,602 | Dolude | Oct. 11, 1955 |
| 2,732,720 | Taylor | Jan. 31, 1956 |
| 2,737,054 | Wendt | Mar. 6, 1956 |

FOREIGN PATENTS

| | | |
|---|---|---|
| 896,563 | Germany | Nov. 12, 1953 |